United States Patent [19]

Dück et al.

[11] 4,139,205

[45] Feb. 13, 1979

[54] CIRCUMFERENTIALLY RESILIENT PISTON RING

[75] Inventors: Gerhard Dück; Martin Morsbach; Paul Jöhren, all of Burscheid, Fed. Rep. of Germany

[73] Assignee: Goetze AG, Burscheid, Fed. Rep. of Germany

[21] Appl. No.: 883,851

[22] Filed: Mar. 6, 1978

[30] Foreign Application Priority Data

Mar. 14, 1977 [DE] Fed. Rep. of Germany ....... 2711018

[51] Int. Cl.$^2$ .............................. F16F 9/36; F16J 9/20

[52] U.S. Cl. ..................................... 277/140; 277/200; 267/1.5

[58] Field of Search ................................ 277/138-141, 277/200; 267/1.5

[56] References Cited

U.S. PATENT DOCUMENTS

| | | | |
|---|---|---|---|
| 2,764,458 | 9/1956 | Ward et al. | 277/200 |
| 2,804,361 | 8/1957 | Shirk | 277/140 |
| 3,191,946 | 6/1965 | Hamm | 277/138 |
| 3,485,504 | 12/1969 | Wells | 267/1.5 X |

*Primary Examiner*—Robert S. Ward, Jr.
*Attorney, Agent, or Firm*—Spencer & Kaye

[57] ABSTRACT

A piston ring formed of an annular, cross-sectionally bent metal strip has a series of circumferentially distributed slots extending in a generally axial orientation from edges of the strip. The slots are in an overlapping relationship when viewed circumferentially for defining a series of circumferential, resilient webs. The webs have web portions that are readily deformable to bending forces.

14 Claims, 10 Drawing Figures

36 38 35 34 37 39

CIRCUMFERENTIALLY RESILIENT PISTON RING

BACKGROUND OF THE INVENTION

This invention relates to an oil scraper piston ring which finds application particularly in internal combustion engines and which is formed of an annularly bent, cross-sectionally U-shaped sheet metal strip having slots extending alternatingly from the one and the other edge of the strip in an axial orientation. The slots are in an overlapping relationship when the metal strip is viewed circumferentially. In this manner, resilient webs are formed between the slots.

Oil scraper piston rings formed of, for example, a radially outwardly open, cross-sectionally U-shaped annularly bent metal strip are generally well known. Such piston rings engage either with radially inwardly oriented resilient tongues the base of the piston groove or they are resilient in the circumferential direction. According to a particularly advantageous prior art structure, in the metal strip there are provided substantially axially oriented slots which extend alternatingly from the one and the other strip edge and which overlap in the mid zone of the strip and thus form resilient webs. Further, radially inwardly open and circumferentially resilient metal strips are also known and are used as spreader spring rings for lamina-shaped oil scraper rings. Such spreader spring rings have, in the zone of their radially inner flank edges, axially bent support feet which serve for the radial support and often also for the axial support of the oil scrapper rings.

The problems involved in the flank deformation of the above-outlined piston ring structures are discussed in U.S. Pat. No. 2,764,458. It has been found that during the installation of such an oil scraper piston ring, a buckling of the flank segments in the axial direction upon compression of the metal strip in the circumferential direction cannot be prevented (dependent upon the stiffness of the resilient webs interconnecting the flank segments), since the resistance of the flank segments to deformation, relative to a tangential bending axis is, as a rule, substantially smaller than the deformation resistance of the resilient webs arranged perpendicularly thereto in the central zone of the metal strip. Such deformations of the ring flanks prevent a face-to-face sealing engagement of the oil scraper piston ring particularly with that side wall of the piston groove which is oriented towards the combustion chamber; as a result, the groove wear too, is also substantially increased. For this purpose, the above-noted U.S. Pat. No. 2,764,458 suggests a subsequent grinding of the oil scraper piston ring in its biased state.

SUMMARY OF THE INVENTION

It is an object of the invention to provide an improved oil scraper piston ring of the above-outlined type from which flank deformations during installation of the piston ring are substantially eliminated.

This object and others to become apparent as the specification progresses, are accomplished by the invention, according to which, briefly stated, the piston ring formed of an annular, cross-sectionally bent metal strip has a series of circumferentially distributed slots extending in a generally axial orientation from edges of the strip. The slots are in an overlapping relationship when viewed circumferentially for defining a series of circumferential, resilient webs. The webs have web portions that are readily deformable to bending forces.

The readily bendable web portions are preferably situated entirely externally of the ring flanks. In this manner, it is ensured that upon stressing the sheet metal piston ring in the circumferential direction, exclusively the resilient webs are deformed (in a substantially elastic manner), while the flank segments of the sheet metal piston ring which are more resistant to bending, retain their shape. Thus, because of the ready bending deformability of the resilient webs, a subsequent machining of the flank segments may be dispensed with.

The above-noted readily bendable web portions may be provided in a particularly simple manner by partial widening of the alternating slots. From the point of view of manufacturing technology it is preferred to provide circular cutouts as the partial enlargements. The circular cutouts may have various configurations, dimensions and/or positions whereby, if desired asymmetrical force relationships in the cross section of the sheet metal piston ring may be achieved for causing a twisting thereof in the piston groove.

The invention may find application also in oil scraper piston rings which have a metal strip with either radially outwardly or radially inwardly open U-shaped cross section. In case of a radially inward orientation of the U-shaped cross section, the piston ring is either directly in engagement with the cylinder wall and serves as the piston ring or functions as a spreader spring ring for at least one, but preferably two, lamina-shaped oil scraper rings. In such an embodiment, the readily bendable portions of the resilient webs may be intentionally present also in the flank zone of the spreader spring; in this manner, a predetermined twist of the spring webs exerts an additional axial pressing force on the oil scraper rings against the flanks of the piston grooves.

DESCRIPTION OF THE PREFERRED EMBODIMENTS

Figure 1:
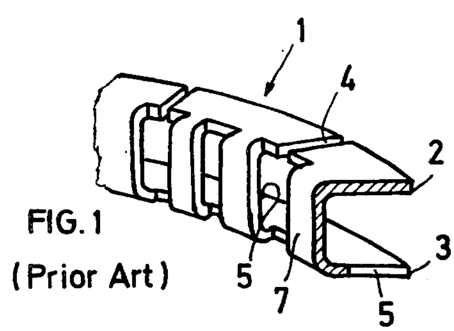
FIG. 1 is a fragmentary perspective view of an oil scraper piston ring structured according to the prior art.
Figure 2:
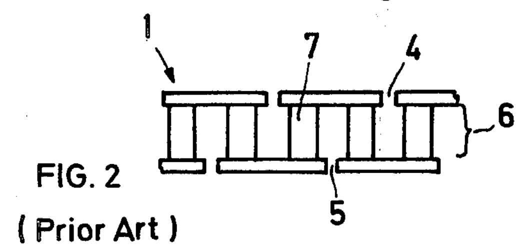
FIG. 2 is a fragmentary developed side elevational view of the prior art structure in a relaxed state.
Figure 3:
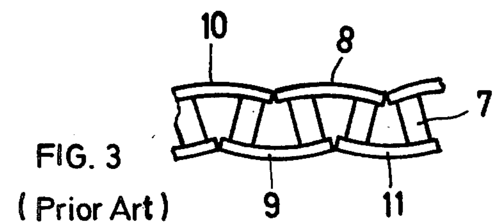
FIG. 3 is a view similar to FIG. 2, showing the prior art structure in a circumferentially compressed state.

FIGS. 1, 2 and 3 illustrate a conventional oil scraper piston ring formed of a metal strip 1 having a U-shaped cross section. The annularly bent strip 1 is rendered resilient in the circumferential direction by the provision of a plurality of circumferentially distributed series of slots 4 and 5 extending, respectively, from the one and the other edge 2 and 3 of the strip 1 and having essentially an axial orientation. In the central zone 6 of the metal strip 1 the slots 4 and 5, when viewed in the circumferential direction, overlap and thus define webs 7 between themselves. By virtue of this arrangement the annularly bent metal strip 1 is circumferentially resilient. Such resilient piston rings are biased to assume a smaller diameter in order to achieve a radially outwardly directed sealing pressure in the built-in condition. To achieve such a bias, the annular metal strip 1 is compressed in the circumferential direction as illustrated in FIG. 3. By virtue of the lesser resistance to bending in the zone of the flank segments 8 and 9, the latter undergo a substantial bending deformation, so that the flank faces 10 and 11 of the piston ring will have only a point or line contact with the side walls of the piston groove (not shown) in which the piston ring 1 is received. This circumference leads to increased wear and leakages.

Figure 4:
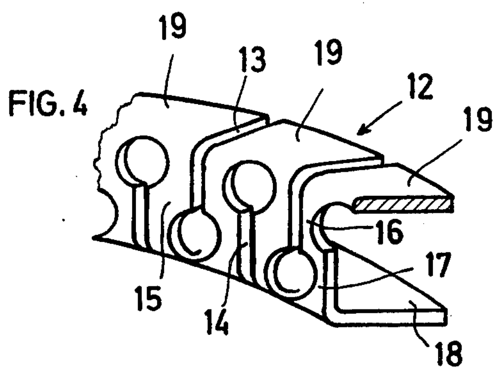
FIG. 4 is a fragmentary perspective view of a preferred embodiment of the invention.
Figure 5:
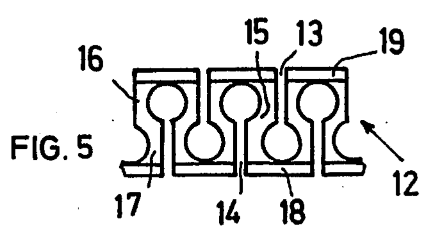
FIG. 5 is a fragmentary developed side elevational view of the same embodiment in a relaxed state.
Figure 6:
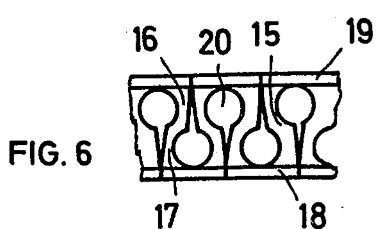
FIG. 6 is a view similar to FIG. 5 showing the structure in a circumferentially compressed state.

Turning now to FIGS. 4, 5 and 6, there is shown a preferred embodiment of an oil scraper piston ring structured according to the invention. The piston ring is formed of an annularly bent sheet metal strip 12 of U-shaped cross section which is resiliently deformable in the circumferential direction by virtue of a series of alternating slots 13 and 14 extending from the one and the other flank edge of the ring 12. The slots divide the base of the "U" into webs 15. Each web has web portions 16 and 17 which are particularly readily deformable in response to bending forces and which, upon biasing the metal strip 12, deform elastically. At the same time, the flank segments 18 and 19 retain their form-stability, so that the outer faces of the flank segments 18 on the one hand, and those of the flank segments 19, on the other hand, lie, in the built-in (biased) condition — as illustrated in FIG. 6 — in one plane and thus assume a face-to-face relationship with the respective side wall of the piston groove (not shown).

To achieve the ready deformability of the web portions 16 and 17 of the webs 15 in response to the bending forces, circular cutouts 20 are provided at the inner ends of the slots 13 and 14 as an enlargement thereof. The cutouts 20 are provided in the mid zone of the metal strip so that the readily deformable web portions 16 and 17 of the web 15 are situated externally of the flanks of the ring 12. Stated differently, the enlargements 20 are provided in the base of the cross-sectionally U-shaped ring 12. In operation, the oil scraper piston ring 12 which is open radially outwardly, engages the cylinder wall of the internal combustion engine with the outer edge of each flank segment 18 and 19.

Figure 7:
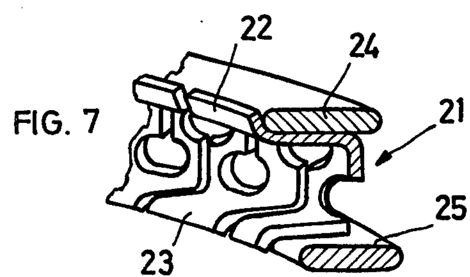
FIG. 7 is a fragmentary perspective view of a further preferred embodiment of the invention.
Figure 8:
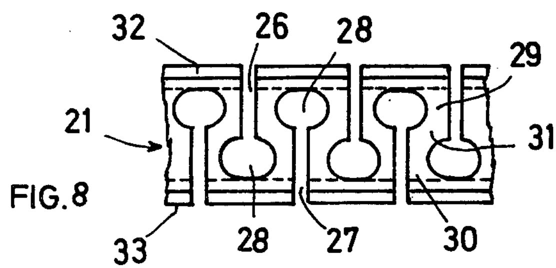
FIG. 8 is a fragmentary developed side elevational view of the same embodiment.

In FIG. 7 there is illustrated an embodiment of the oil scraper piston ring which is formed of a radially inwardly open, cross-sectionally U-shaped metal strip 21 which has axially bent and circumferentially distributed feet 22 and 23 which extend behind lamina-shaped oil scraper rings 24 and 25, respectively. The metal strip 21 serves exclusively as a spreader spring for the oil scraper rings 24, 25. A fragmentary developed view of the metal strip 21 is illustrated in FIG. 8. The alternating slots 26 and 27 have at their inner terminus circular cutouts 28 which result in readily deformable cross-sectional zones 29, 30 of the resilient webs 31 externally of the flanks 32 and 33.

Instead of the circular cutouts described in the embodiments for achieving the ready deformability of the web portions, it is to be understood that the cutouts may have other shapes. Furthermore, other measures, known by themselves, may be resorted to. For example, annealing may be used for the partial decrease of the bending resistance of the spring webs.

Figure 9:
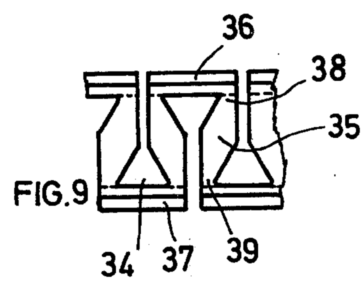
FIG. 9 is a fragmentary developed side elevational view of a further preferred embodiment of the invention.

Another form of the cutouts that may be provided in a spreader ring of the kind shown in FIGS. 7 and 8 is illustrated in FIG. 9. The triangular cutouts 34 are situated in such a way that the greatest circumferential extension of each cutout 34 lies near the corner between the web 35 and the respective flank segments 36 and 37 resilient web portions 38 and 39 are formed.

Figure 10:
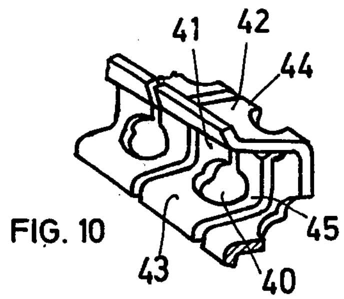
FIG. 10 is a fragmentary perspective view of still another preferred embodiment of the invention.

FIG. 10 shows a spreader ring similar to that of FIG. 7. According to the embodiment illustrated in FIG. 10, the cutouts 40 in the webs 41 extend so far into the flank segments 42 and 43 that the most deformable portions 44 and 45 of the web 41 are lying exactly in the corner between the webs 41 and the respective flank segments 42 and 43. Such a limitation of the axial distance between the web portions 44 and 45 enhances a high deformability of the spreader ring without any deformation of the flanks when the spreader ring is installed together with the oil scraper rings (not shown in FIG. 10) in the groove of a piston.

It will be understood that the above description of the present invention is susceptible to various modifications, changes and adaptations, and the same are intended to be comprehended within the meaning and range of equivalents of the appended claims.

What is claimed is:

1. In a piston ring formed of an annular, cross-sectionally bent metal strip having a series of circumferentially distributed alternating slots extending in a generally axial orientation from edges of the strip; the slots being in an overlapping relationship when viewed circumferentially for defining a series of circumferential, resilient webs, the improvement wherein said webs have web portions that are readily deformable to bending forces.

2. In a piston ring formed of a sheet metal annulus having a base and opposite flanks terminating in flank edges; means defining a series of spaced, circumferentially distributed slots extending, when viewed circumferentially, alternatingly from the one and the other flank edge into the base and being in an overlapping relationship therein; the slots dividing the flanks into a series of flank segments and the base into a series of resilient webs; the improvement comprising means providing, in said webs, web portions being more readily deformable to bending forces than all the other parts of the piston ring.

3. A piston ring as defined in claim 2, wherein said means comprise partial enlargements of said slots.

4. A piston ring as defined in claim 3, wherein said partial enlargements are constituted by circular cutouts forming a continuation of each slot in said base.

5. A piston ring as defined in claim 3, wherein said partial enlargements have unlike configurations.

6. A piston ring as defined in claim 3, wherein said partial enlargements have unlike dimensions.

7. A piston ring as defined in claim 3, wherein said partial enlargements have different locations.

8. A piston ring as defined in claim 2, wherein said sheet metal annulus has a radially outwardly open, U-shaped cross section.

9. A piston ring as defined in claim 2, wherein said sheet metal annulus has a radially inwardly open, U-shaped cross section.

10. A piston ring as defined in claim 2, further comprising means for supporting and urging radially outwardly at least one oil scraper ring arranged on said piston ring.

11. In a piston ring formed of a sheet metal annulus of radially inwardly open, U-shaped cross section having a base and opposite flanks terminating in flank edges; means defining a series of spaced, circumferentially distributed slots extending, when viewed circumferentially, alternatingly from the one and the other flank edge into the base and being in an overlapping relationship therein; the slots dividing the flanks into a series of flank segments and the base into a series of resilient webs; a plurality of circumferentially distributed support means for supporting at least one oil scraper ring arranged on the sheet metal annulus; the improvement comprising means providing, in said webs and in said flank segments, portions being more readily deformable to bending forces than all the other parts of the piston ring.

12. A piston ring as defined in claim 11, wherein said means comprise partial enlargements of said slots; said partial enlargements being located in said webs and said flank segments.

13. A piston ring as defined in claim 3, wherein said partial enlargements are constituted by a triangular cutout forming a continuation of each slot in said base.

14. A piston ring as defined in claim 13, wherein the greatest circumferentially viewed dimension of each triangular cutout is situated immediately adjacent the respective flank segment and constitutes the inner end of the respective enlarged slot in said base.

* * * * *